(12) United States Patent
Yamada

(10) Patent No.: US 11,280,744 B2
(45) Date of Patent: Mar. 22, 2022

(54) APPEARANCE INSPECTION APPARATUS AND APPEARANCE INSPECTION METHOD

(71) Applicant: NIDEC CORPORATION, Kyoto (JP)

(72) Inventor: Eiji Yamada, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 218 days.

(21) Appl. No.: 16/638,749

(22) PCT Filed: Jul. 10, 2018

(86) PCT No.: PCT/JP2018/026003
§ 371 (c)(1),
(2) Date: Feb. 13, 2020

(87) PCT Pub. No.: WO2019/064810
PCT Pub. Date: Apr. 4, 2019

(65) Prior Publication Data
US 2020/0333260 A1 Oct. 22, 2020

(30) Foreign Application Priority Data
Sep. 28, 2017 (JP) .............................. JP2017-188853

(51) Int. Cl.
*G01N 21/95* (2006.01)
*G06T 7/00* (2017.01)

(52) U.S. Cl.
CPC ........... *G01N 21/95* (2013.01); *G06T 7/0004* (2013.01); *G06T 2207/30108* (2013.01)

(58) Field of Classification Search
CPC ................. G01N 21/95; G06T 7/0004; G06T 2207/30108
See application file for complete search history.

(56) References Cited

U.S. PATENT DOCUMENTS

| 5,684,530 A | 11/1997 | White | |
|---|---|---|---|
| 2014/0078498 A1* | 3/2014 | Ikushima | G01N 21/88 356/237.1 |
| 2014/0104411 A1 | 4/2014 | Ryu et al. | |

FOREIGN PATENT DOCUMENTS

| JP | 2009-236648 A | 10/2009 |
|---|---|---|
| JP | 2015-137921 A | 7/2015 |

* cited by examiner

*Primary Examiner* — Jamil Ahmed
(74) *Attorney, Agent, or Firm* — Hauptman Ham, LLP

(57) ABSTRACT

Accuracy of detecting abnormalities on the surface of a workpiece is improved. An appearance inspection apparatus for inspecting the appearance of a workpiece is provided. The appearance inspection apparatus for inspecting the appearance of the workpiece includes a first lighting unit that irradiates the workpiece with light, a first imaging unit that images the workpiece irradiated by the first lighting unit, a first detection unit that detects a first defect from an image captured by the first imaging unit, a second lighting unit that irradiates the workpiece with light, a second imaging unit that images the workpiece irradiated by the second lighting unit, and a second detection unit that detects a second defect from an image captured by the second imaging unit. The first lighting unit uses coaxial epi-illumination, and the second lighting unit uses coaxial epi-illumination and dome illumination.

8 Claims, 8 Drawing Sheets

APPEARANCE INSPECTION APPARATUS AND APPEARANCE INSPECTION METHOD

CROSS-REFERENCE TO RELATED APPLICATIONS

This is the U.S. national stage of application No. PCT/JP2018/026003, filed on Jul. 10, 2018, and priority under 35 U.S.C. § 119(a) and 35 U.S.C. § 365(b) is claimed from Japanese Application No. 2017-188853, filed on Sep. 28, 2017.

FIELD OF THE INVENTION

The present invention relates to an appearance inspection apparatus and an appearance inspection method.

BACKGROUND

Conventionally, an appearance inspection apparatus using coaxial epi-illumination and dome illumination has been known. For example, conventionally, there has been known an appearance inspection apparatus including an imaging means using blue LED dome illumination and blue LED coaxial epi-illumination, and an imaging means using white LED dome illumination and white LED coaxial epi-illumination.

In recent years, for inspecting the appearance of a base plate of a hard disk drive, automation of inspection has been promoted using an appearance inspection apparatus. As an appearance inspection apparatus, for example, an appearance inspection apparatus using the above-described coaxial epi-illumination and dome illumination is used.

When a base plate is formed by casting, flow lines, shallow unevenness, or a rough surface is formed on the surface of the base plate. Hereinafter, flow lines, shallow unevenness, or a rough surface formed on the surface of the base plate are collectively referred to as ground patterns. The ground pattern is not a defect in the appearance of the base plate.

When the appearance of a base plate is inspected by an appearance inspection apparatus using coaxial epi-illumination and dome illumination, a shadow generated on the ground pattern of the base plate is eliminated in a captured image. Since the ground pattern of the base plate is eliminated, only an abnormality of the surface shape of the base plate is detected. That is, the appearance inspection apparatus using the coaxial epi-illumination and the dome illumination can detect a flaw on the surface of the base plate, peeling of the surface coat, or burrs. Here, the surface coat is a surface film applied to the base plate surface. Such surface treatment is performed for rust prevention, insulation, and prevention of dust generation on the surface of the base plate.

On the other hand, for example, a foreign substance attached to the surface of the base plate such as an adhesive may not be identified as a ground pattern of the base plate in a captured image. That is, in the appearance inspection apparatus using the coaxial epi-illumination and the dome illumination, a shadow equivalent to the shadow caused by the ground pattern may be eliminated in the captured image. As a result, the appearance inspection apparatus using the coaxial epi-illumination and the dome illumination may not be able to detect a foreign substance attached to the surface of the workpiece.

SUMMARY

An appearance inspection apparatus according to an exemplary embodiment of the present invention is an appearance inspection apparatus for inspecting appearance of a workpiece. The apparatus includes a first lighting unit that irradiates the workpiece with light; a first imaging unit that images the workpiece irradiated by the first lighting unit; a first detection unit that detects a first defect from an image captured by the first imaging unit; a second lighting unit that irradiates the workpiece with light; a second imaging unit that images the workpiece irradiated by the second lighting unit; and a second detection unit that detects a second defect from an image captured by the second imaging unit. The first lighting unit uses coaxial epi-illumination, and the second lighting unit uses coaxial epi-illumination and dome illumination.

The above and other elements, features, steps, characteristics and advantages of the present disclosure will become more apparent from the following detailed description of the preferred embodiments with reference to the attached drawings.

DETAILED DESCRIPTION

Figure 1:
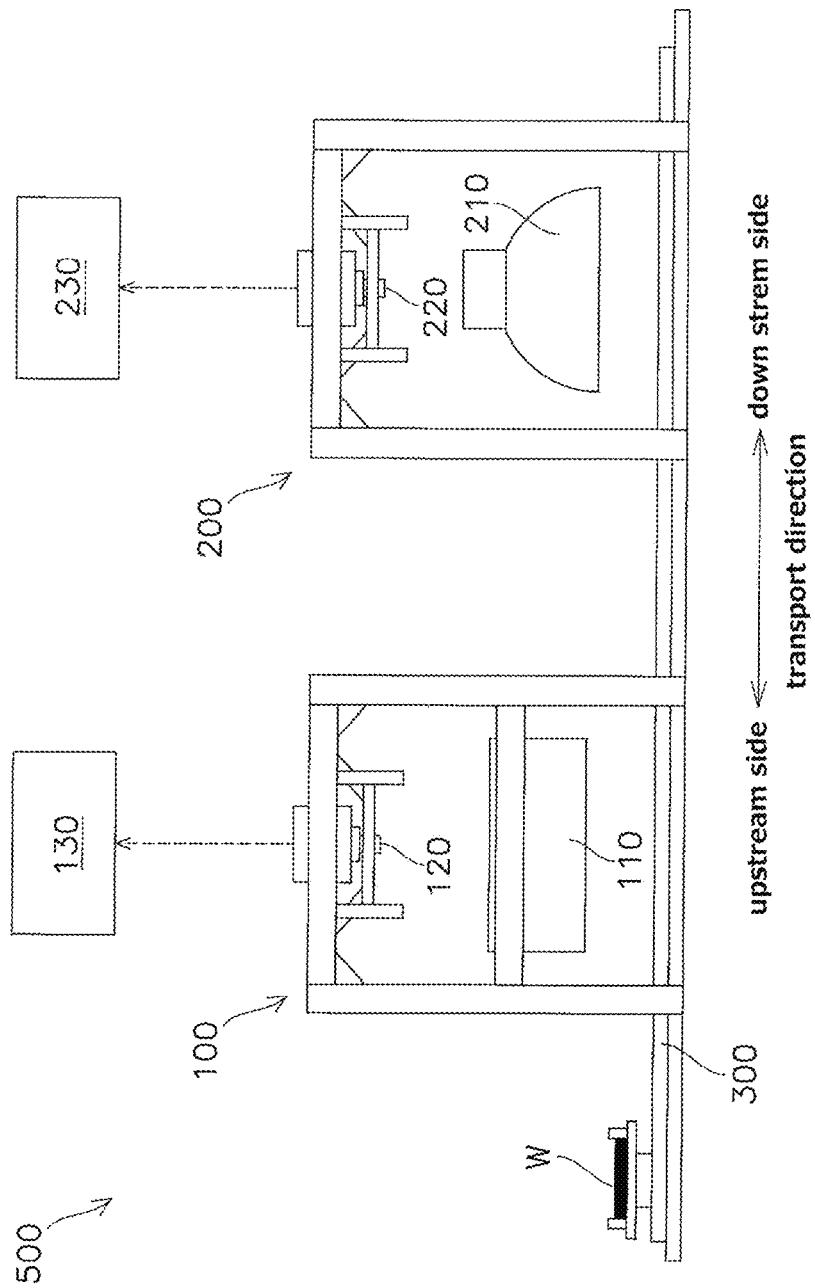
FIG. 1 is a schematic diagram of an appearance inspection apparatus.

Hereinafter, embodiments of the present invention will be described with reference to the drawings. Note that the scope of the present invention is not limited to the following embodiments, but may be arbitrarily changed within the technical spirit of the present invention.

In the following description, the direction in which a workpiece W is transported in an appearance inspection apparatus 500 is referred to as a transport direction. One along the transport direction is called an upstream side, and the other is called a downstream side. Further, a direction orthogonal to the transport direction is referred to as a vertical direction.

In the drawings used in the following description, for the purpose of emphasizing the characteristic part, the characteristic part may be shown in an enlarged manner for convenience. Therefore, the dimensions and ratios of respective components are not necessarily the same as actual ones. For the same purpose, less characteristic portions may be omitted from the drawings.

The appearance inspection apparatus 500 will be described with reference to FIGS. 1 to 3. As shown in FIG. 1, the appearance inspection apparatus 500 is an apparatus for inspecting the appearance of the workpiece W. The workpiece W is, for example, a base plate of a hard disk drive. The appearance inspection apparatus 500 includes a first inspection unit 100, a second inspection unit 200, and a transport unit 300.

As shown in FIG. 1, the first inspection unit 100 inspects the appearance of the workpiece W using coaxial epi-illumination. The first inspection unit 100 includes a first lighting unit 110, a first imaging unit 120, and a first detection unit 130.

The first inspection unit 100 is provided upstream of the second inspection unit 200 in the transport direction. The first inspection unit 100 and the second inspection unit 200 are provided independently of each other. The first inspection unit 100 is provided at a predetermined distance from the second inspection unit 200. The detailed description of the first lighting unit 110 will be described later.

The first imaging unit 120 captures an image of the workpiece W irradiated by the first lighting unit 110. The first imaging unit 120 is, for example, an area sensor camera. The first imaging unit 120 is electrically connected to the first detection unit 130.

The first detection unit 130 detects a first defect from the image captured by the first imaging unit 120. The first detection unit 130 is, for example, a computer system and includes a central processing unit (CPU), a read only memory (ROM), a random access memory (RAM), and a hard disk drive (HDD).

The first detection unit 130 detects a first defect. The first defect includes a foreign substance attached to the surface of the workpiece W. That is, the first defect includes an abnormality other than the ground pattern on the surface of the workpiece W. The ground pattern includes, for example, flow lines, shallow unevenness, or a rough surface formed when the base plate is formed by casting. Note that the ground pattern is not a defect in the appearance of the workpiece W.

Figure 2:
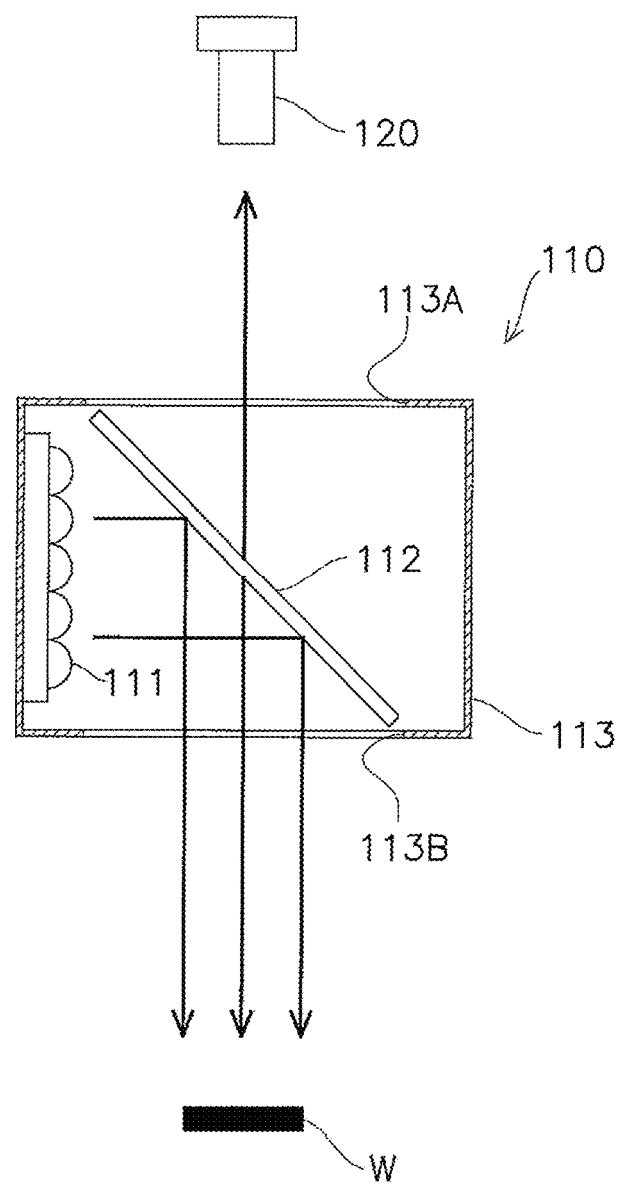
FIG. 2 is a schematic diagram of a first lighting unit.

As shown in FIG. 2, the first lighting unit 110 uses coaxial epi-illumination. The first lighting unit 110 includes a first lighting 111, a half mirror 112, and a first case 113. The first lighting unit 110 illuminates light via the half mirror 112 from the same axis as the imaging direction of the first imaging unit 120. The imaging direction of the first imaging unit 120 is substantially vertical.

As the first lighting 111, for example, light emitting diode (LED) lighting is used. Further, white light is used as the first lighting 111.

The half mirror 112 reflects a part of the incident light and transmits a part thereof. The half mirror 112 is provided inside the first case 113. The half mirror 112 is inclined approximately 45° with respect to a horizontal plane while facing the first lighting 111 and facing downward in the vertical direction.

The first case 113 is a box. The first case 113 includes a first opening 113A and a second opening 113B. The first opening 113A is formed above the first case 113 in the vertical direction. The second opening 113B is formed below the first case 113 in the vertical direction.

With such a configuration, in the first lighting unit 110, the light emitted from the first lighting 111 is refracted downward in the vertical direction by the half mirror 112. The light refracted downward in the vertical direction by the half mirror 112 passes through the second opening 113B, and is specularly and diffusely reflected by the workpiece W. The light specularly and diffusely reflected by the workpiece W passes through the half mirror 112, passes through the first opening 113A, and enters the first imaging unit 120.

In this manner, the first lighting unit 110 can uniformly irradiate the workpiece W with light parallel to the imaging direction of the first imaging unit 120, and can make the ground pattern of the workpiece W emerge. That is, a flat part of the surface of the workpiece W becomes white, and a part whose surface is inclined becomes black, so that the ground pattern can be captured as a shadow. When a defect in which an adhesive adheres to the workpiece W occurs, a thin layer of the adhesive adheres to the surface of the workpiece W along the surface shape. As a result, the portion to which the adhesive has adhered is darker than the normal ground pattern (to which no adhesive has adhered).

As shown in FIG. 1, the second inspection unit 200 inspects the appearance of the workpiece W using coaxial epi-illumination and dome illumination. The second inspection unit 200 includes a second lighting unit 210, a second imaging unit 220, and a second detection unit 230. The second inspection unit 200 is provided downstream of the first inspection unit 100 in the transport direction. The detailed description of the second lighting unit 210 will be described later.

The second imaging unit 220 captures an image of the workpiece W irradiated by the second lighting unit 210. The second imaging unit 220 is, for example, an area sensor camera. The second imaging unit 220 is electrically connected to the second detection unit 230.

The second detection unit 230 detects a second defect from the image captured by the second imaging unit 220. The second detection unit 230 is a computer system including a CPU, a ROM, a RAM, and an HDD.

The second detection unit 230 detects a second defect. The second defect includes a state where the surface shape of the workpiece W is not normal. The state in which the surface shape of the workpiece W is not normal includes, for example, a flaw on the surface of the workpiece W, peeling of the surface coat of the workpiece W, or burrs.

Figure 3:
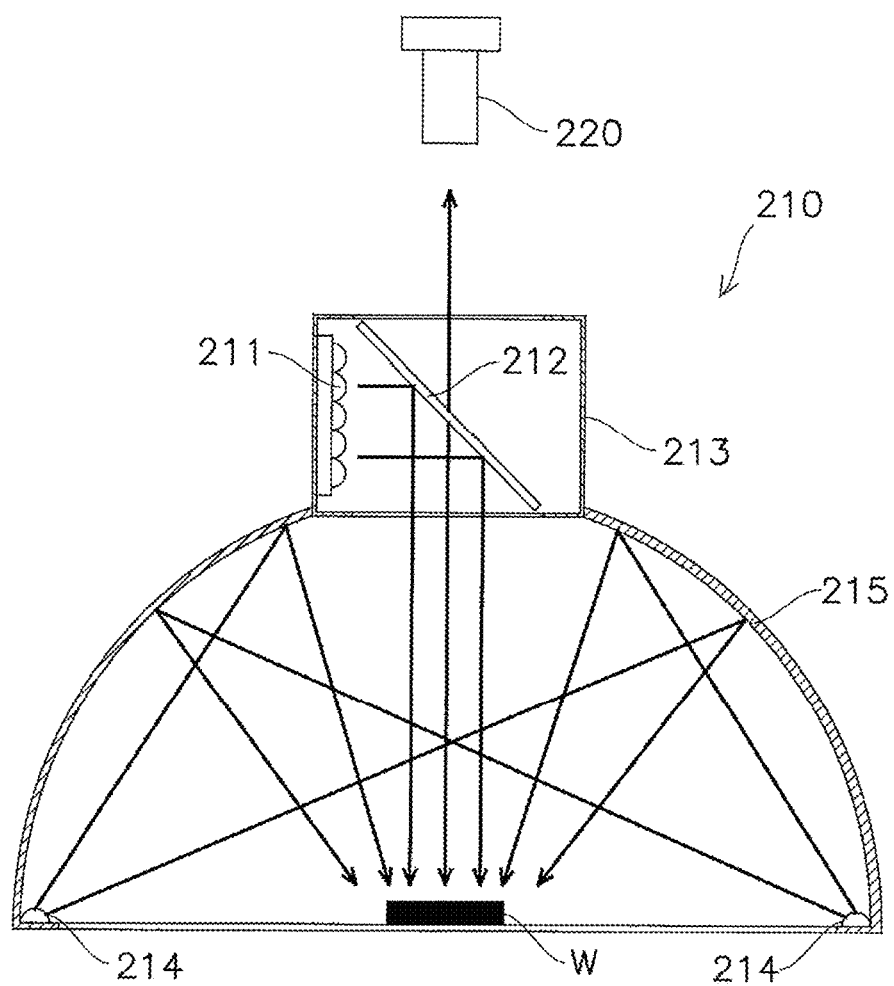
FIG. 3 is a schematic diagram of a second lighting unit.

As shown in FIG. 3, the second lighting unit 210 uses coaxial epi-illumination and dome illumination. The second lighting unit 210 includes a second A lighting 211, a half mirror 212, a second A case 213, a second B lighting 214, and a second B case 215.

The second A lighting 211 has the same configuration as the first lighting 111. Therefore, the description of the second A lighting 211 is omitted. The half mirror 212 has the same configuration as the half mirror 112. Therefore, description of the half mirror 112 is omitted. The second A case 213 has the same configuration as the first case 113. Therefore, description of the second A case 213 is omitted.

As the second B lighting 214, for example, LED lighting is used. As the second B lighting 214, white light is used. The second B case 215 has a hollow hemispherical shape. The second B case 215 is provided below the second A case 213. A plurality of second B lightings 214 are provided inside the second B case 215 and at the edge of the lower end.

With such a configuration, in the second lighting unit 210, the light emitted from the second A lighting 211 is refracted downward in the vertical direction by the half mirror 212. The light refracted downward in the vertical direction by the half mirror 212 is specularly and diffusely reflected by the workpiece W. The light specularly and diffusely reflected by the workpiece W passes through the half mirror 212 and enters the second imaging unit 220.

At the same time, in the second lighting unit 210, the light emitted from the second B lighting 214 is reflected inside the second B case 215 and is diffused inside the second B case 215. The light diffused inside the second B case 215 uniformly illuminates the workpiece W from all directions above. This illumination light is specularly and diffusely reflected by the workpiece W. The light specularly and diffusely reflected by the workpiece W passes through the half mirror 212 and enters the second imaging unit 220.

In this way, since the second lighting unit 210 irradiates the workpiece W with uniform light, it is possible to eliminate the shadow generated on the ground pattern of the workpiece W from the image captured by the second imaging unit 220. The second detection unit 230 can detect only the surface shape abnormality of the workpiece W from the image in which the ground pattern of the workpiece W has been eliminated. That is, a flaw on the surface of the workpiece W, peeling of the surface coat, or burrs can be detected.

Figure 4:
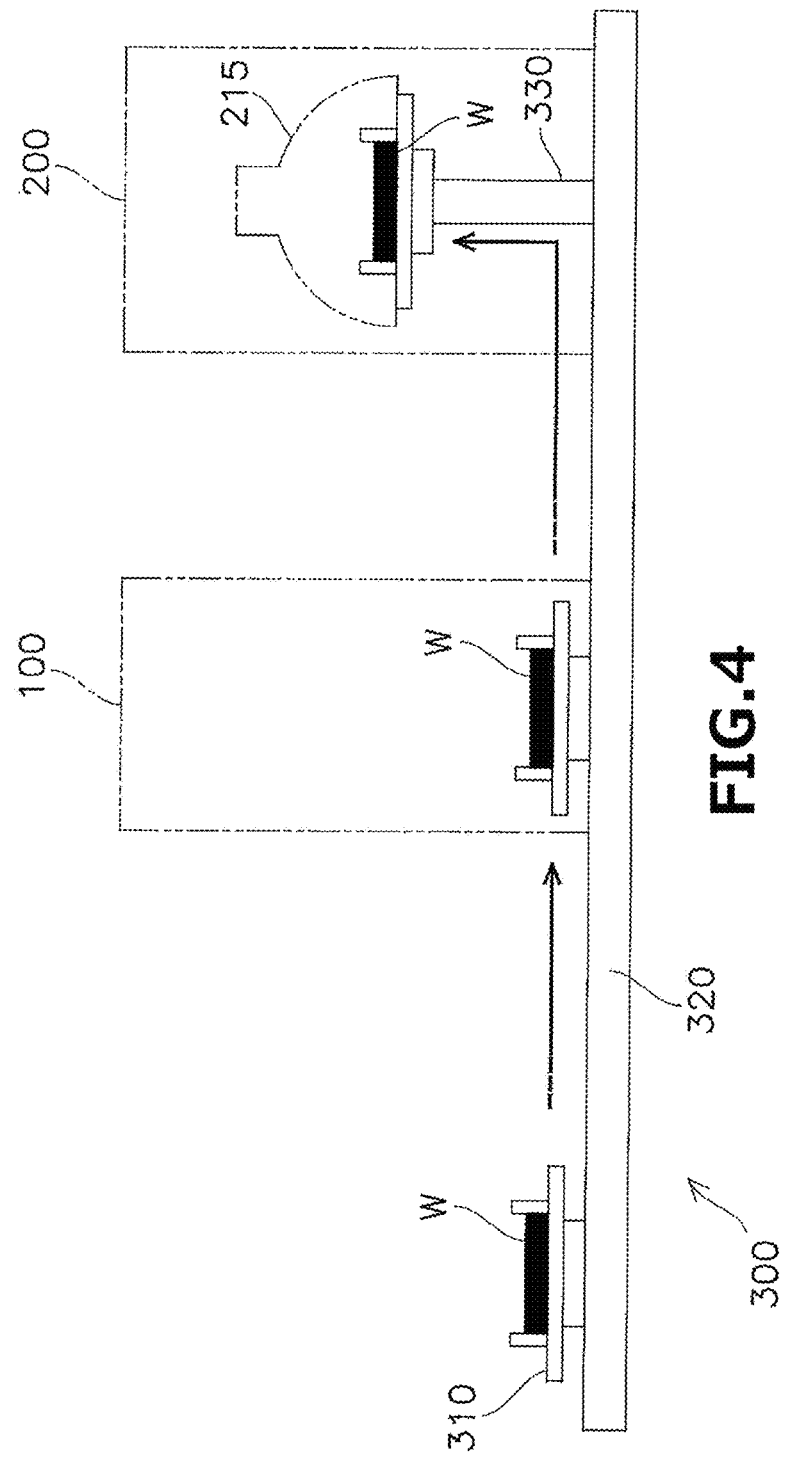
FIG. 4 is a schematic diagram showing a transport unit.

As shown in FIG. 4, the transport unit 300 transports the workpiece W in the appearance inspection apparatus 500. The transport unit 300 includes a fixing unit 310, a moving unit 320, and a lifting unit 330.

The fixing unit 310 fixes the workpiece W. The moving unit 320 moves the fixing unit 310 in the transport direction. The moving unit 320 stops the fixing unit 310 in the first inspection unit 100 or the second inspection unit 200. The moving unit 320 uses, for example, an air cylinder or a stage using a motor as a driving force.

The lifting unit 330 lifts or lowers the fixing unit 310 in the vertical direction below the second inspection unit 200 in the vertical direction. The lifting unit 330 uses, for example, an air cylinder or a stage using a motor as a driving force.

With such a configuration, on the transport unit 300, the workpiece W fixed to the fixing unit 310 is transported in the transport direction of the appearance inspection apparatus 500. On the transport unit 300, the workpiece W is stopped at the first inspection unit 100 or the second inspection unit 200. Further, on the transport unit 300, the workpiece W stopped at the second inspection unit 200 is lifted or lowered toward the second B case 215 of the second inspection unit 200.

Figure 5:
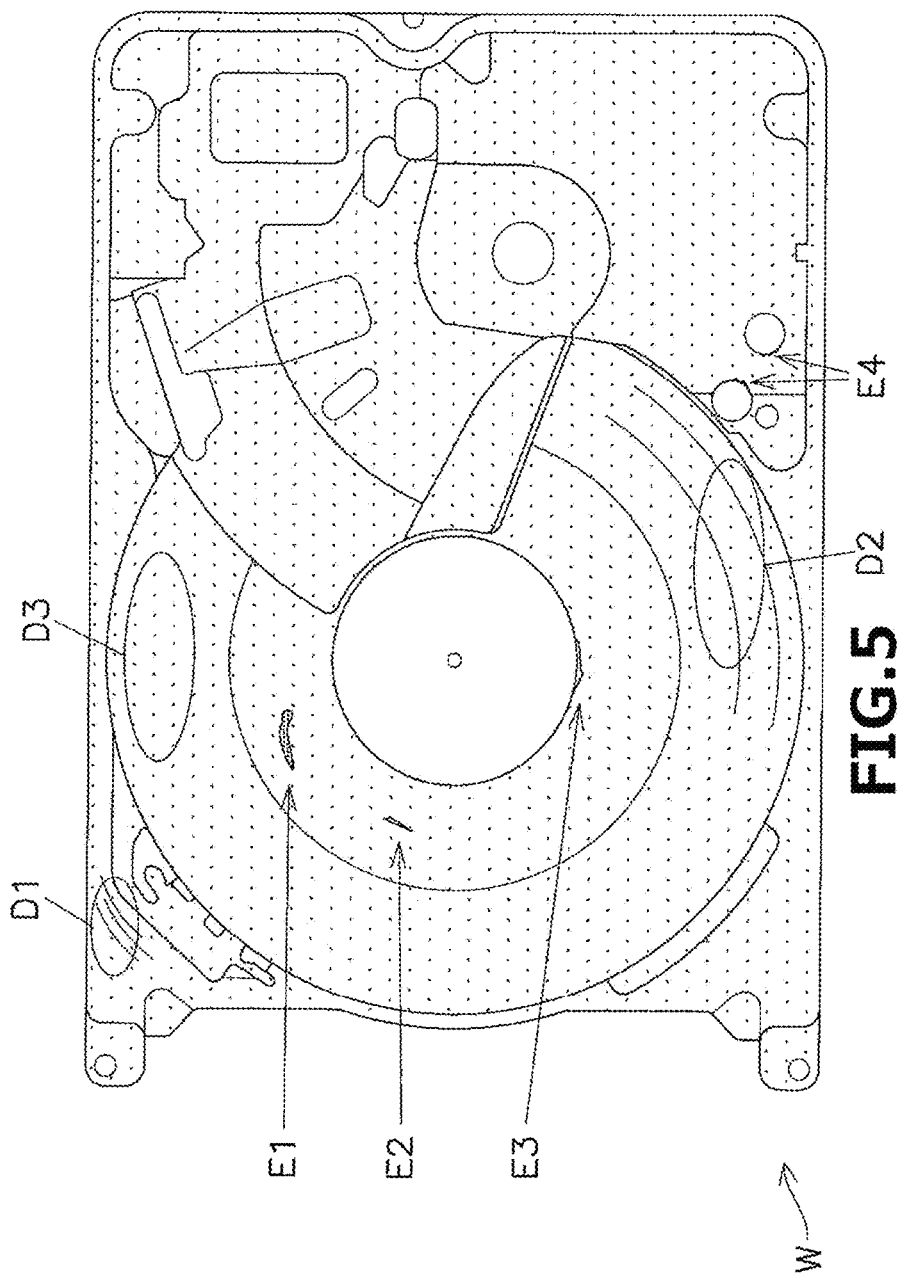
FIG. 5 is a plan view of a base plate of a hard disk drive.

The workpiece W will be described with reference to FIG. 5. In FIG. 5, for the sake of simplicity, all possible defects of the workpiece W are included.

As described above, the workpiece W is, for example, a base plate of a hard disk drive. The surface of the workpiece W includes a ground pattern. The ground pattern includes, for example, flow lines D1, shallow unevenness D2, or a rough surface D3 formed when the base plate is formed by casting. Note that the ground pattern is not a defect in the appearance of the workpiece W.

The workpiece W includes a first defect and a second defect. The first defect includes a foreign substance E1 attached to the surface of the workpiece W. The foreign substance E1 is, for example, an adhesive. The adhesive is used in the process of manufacturing a hard disk drive. The first defect is the adhesive erroneously adhering to the surface of the base plate during the manufacturing process. The second defect includes a state where the surface shape of the workpiece W is not normal. The state where the surface shape of the workpiece W is not normal includes, for example, a flaw E2 on the surface of the workpiece W, peeling E3 of the surface coat of the workpiece W, or a burr E4.

Figure 6:
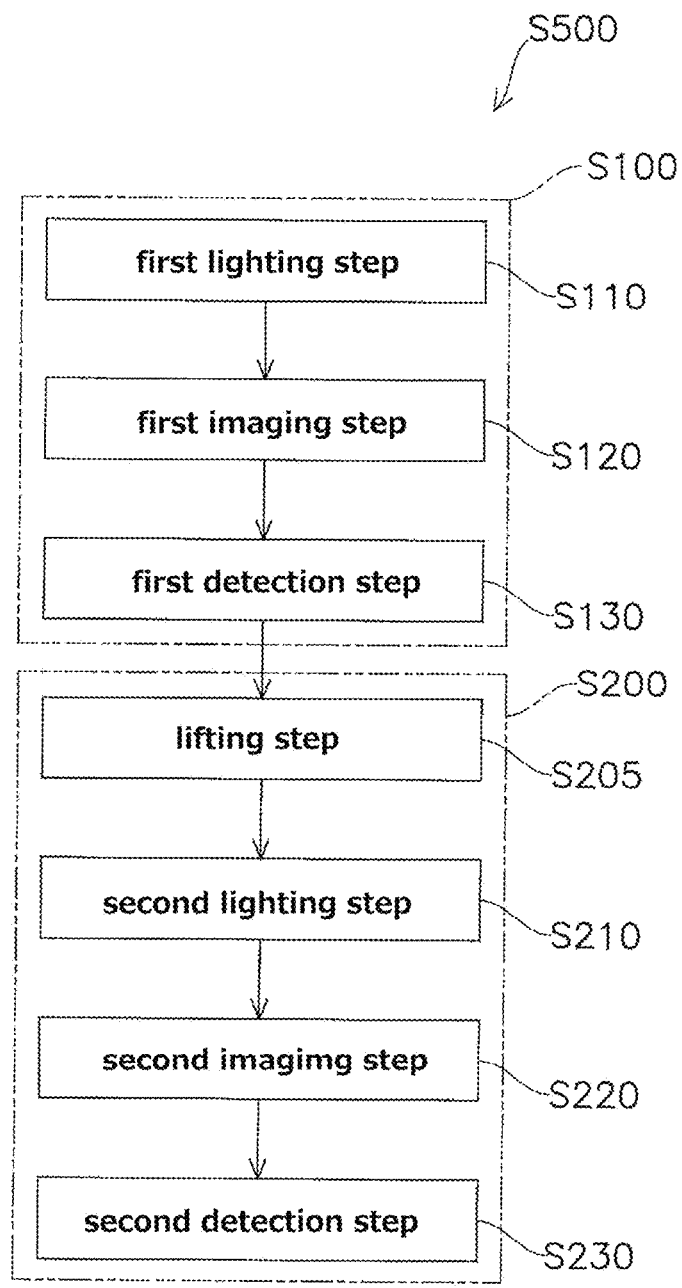
FIG. 6 is a flowchart showing an appearance inspection step.

An appearance inspection step S500 will be described with reference to FIGS. 6 to 8. As shown in FIG. 6, the appearance inspection step S500 is an appearance inspection method for inspecting the appearance of the workpiece W using the appearance inspection apparatus 500. The appearance inspection step S500 includes a first inspection step S100 and a second inspection step S200.

The first inspection step S100 is processed by the first inspection unit 100. The first inspection step S100 includes a first lighting step S110, a first imaging step S120, and a first detection step S130.

The first lighting step S110 is performed by the first lighting unit 110. In the first lighting step S110, the workpiece W is irradiated by the first lighting unit 110. In the first lighting step S110, the workpiece W is irradiated with coaxial epi-illumination. At this time, the workpiece W is uniformly irradiated with light parallel to the imaging axis of the first imaging unit 120.

The first imaging step S120 is processed by the first imaging unit 120. In the first imaging step S120, the workpiece W irradiated in the first lighting step S110 is imaged by the first imaging unit 120. In the first imaging step S120, the first imaging unit 120 captures an image P1.

Figure 7:
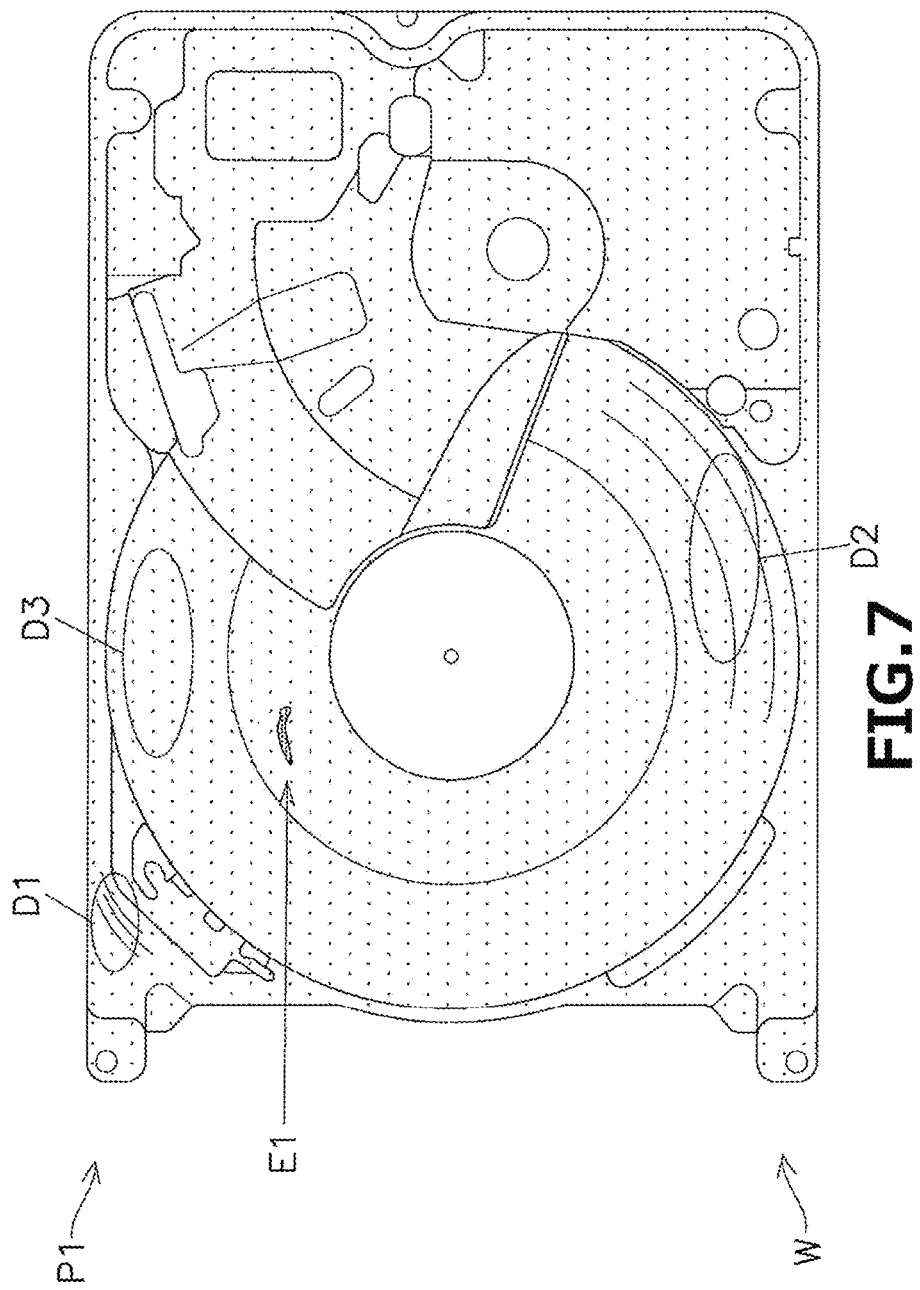
FIG. 7 is a schematic diagram illustrating an image captured in a first imaging step.

As shown in FIG. 7, the ground pattern on the surface of the workpiece W emerges in the image P1. In the image P1, the ground pattern on the surface of the workpiece W and the foreign substance E1 attached to the surface of the workpiece W are clearly identified. That is, in the image P1, the flow lines D1, the shallow unevenness D2, or the rough surface D3 as the ground pattern and the foreign substance E1 are identified.

The first detection step S130 is performed by the first detection unit 130. In the first detection step S130, the first detection unit 130 detects a first defect from the image P1 captured in the first imaging step S120. That is, in the first detection step S130, in the image P1, the foreign substance E1, which is clearly distinguished from the flow lines D1, the shallow unevenness D2, or the rough surface D3, is detected.

Specifically, in the first detection step S130, first, the first detection unit 130 partitions the image P1 into one or more predetermined regions. Next, the first detection unit 130 detects, for each of the partitioned regions, a portion where the pixel value is outside a predetermined range in the region. That is, a pixel indicating a pixel value within the predetermined range is regarded as normal. Pixels that indicate pixel values that are darker than normal (lower than the lower limit of the predetermined range) or pixels that indicate pixel values that are lighter than normal (higher than the upper limit of the predetermined range) are detected. Then, a portion where the detected pixel value is out of the predetermined range is detected as a first defect by the first detection unit 130.

A second inspection step S200 is performed by the second inspection unit 200. The second inspection step S200 includes a lifting step S205, a second lighting step S210, a second imaging step S220, and a second detection step S230.

In the lifting step S205, the workpiece W is lifted in the vertical direction by the lifting unit 330. At this time, the workpiece W is moved up to the lower end of the second B case 215 of the second lighting unit 210 by the lifting unit 330.

The second lighting step S210 is processed by the second lighting unit 210. In the second lighting step S210, the workpiece W is irradiated by the second lighting unit 210. In the second lighting step S210, the workpiece W is irradiated with coaxial epi-illumination and dome illumination. At this time, the workpiece W is irradiated with uniform light.

The second imaging step S220 is processed by the second imaging unit 220. In the second imaging step S220, the workpiece W irradiated in the second lighting step S210 is imaged by the second imaging unit 220. In the second imaging step S220, an image P2 is captured by the second imaging unit 220.

Figure 8:
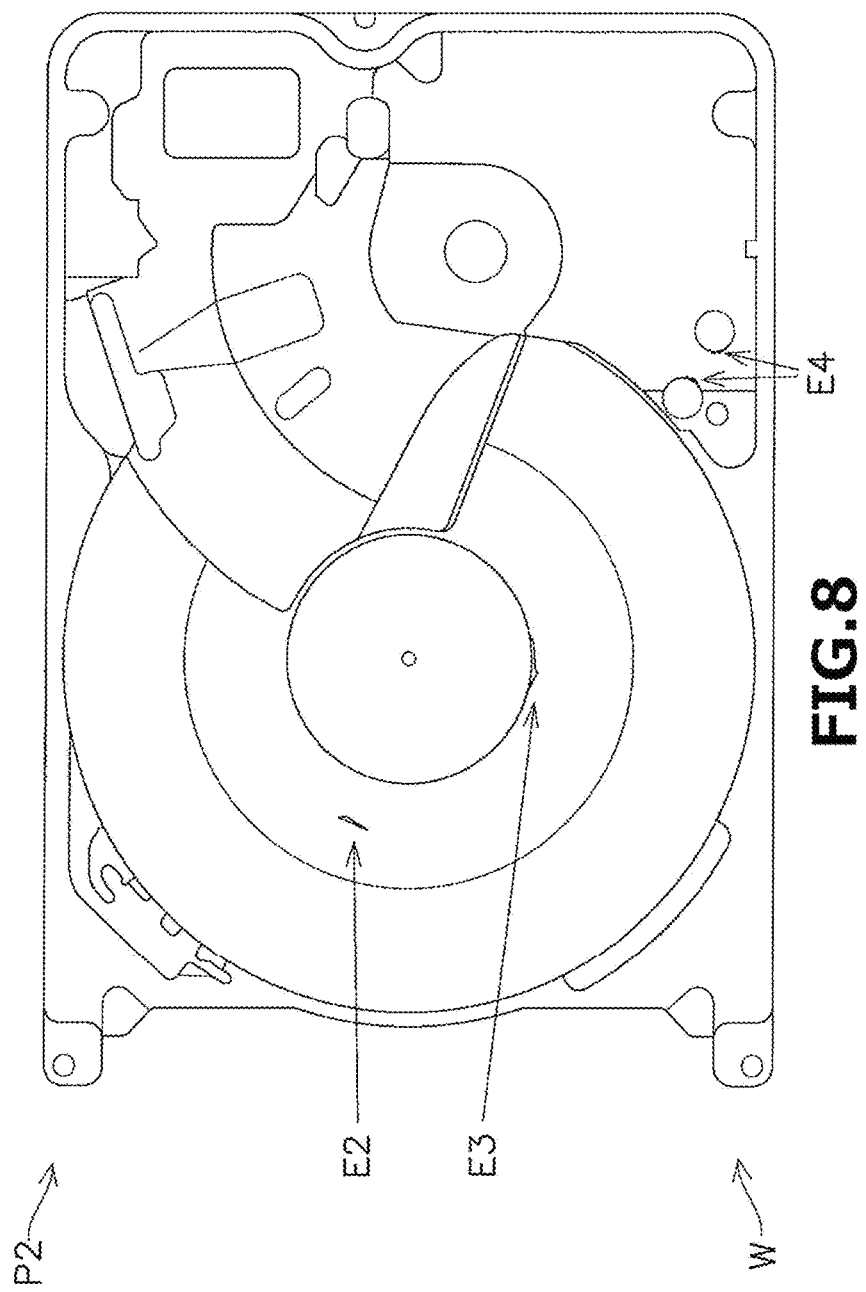
FIG. 8 is a schematic diagram illustrating an image captured in a second imaging step.

As shown in FIG. 8, in the image P2, the shadow generated on the ground pattern of the workpiece W is eliminated. Then, in the image P2, only an abnormality of the surface shape of the workpiece W is identified. That is, in the image P2, the flaw E2 on the surface of the workpiece W, the peeling E3 of the surface coat of the workpiece W, or the burr E4 is identified.

The second detection step S230 is performed by the second detection unit 230. In the second detection step S230, the second detection unit 230 detects a second defect from the image P2 captured in the second imaging step S220. That is, in the second detection step S230, the flaw E2 on the surface of the workpiece W, the peeling E3 of the surface coat of the workpiece W, or the burr E4 is detected.

Specifically, in the second detection step S230, the image P2 is partitioned into one or more predetermined regions by the second detection unit 230. Next, the second detection unit 230 detects, for each of the partitioned regions, a portion where the pixel value is outside the predetermined range in the region. That is, a pixel indicating a pixel value within the predetermined range is regarded as normal. Pixels that indicate pixel values that are darker than normal (lower than the lower limit of the predetermined range) or pixels that indicate pixel values that are lighter than normal (higher than the upper limit of the predetermined range) are detected. Then, a portion where the detected pixel value is out of the predetermined range is detected as a second defect by the second detection unit 230.

Effects of the appearance inspection apparatus 500 and the appearance inspection step S500 will be described. According to the appearance inspection apparatus 500 and the appearance inspection step S500, the foreign substance E1 attached to the surface of the workpiece W, which is difficult to be distinguished from the ground pattern in the captured image P1, is detected, and the ground pattern of the workpiece W is eliminated in the captured image P2. Thus, abnormalities on the surface of the workpiece W can be detected.

That is, in the first lighting step S110, the workpiece W is irradiated with coaxial epi-illumination. At this time, the workpiece W is uniformly irradiated with light parallel to the axis of the first imaging unit 120. Therefore, the ground pattern on the surface of the workpiece W clearly emerges. At this time, the ground pattern on the surface of the workpiece W and the foreign substance E1 attached to the surface of the workpiece W are clearly identified.

Further, in the second lighting step S210, the workpiece W is irradiated with coaxial epi-illumination and dome illumination. At this time, the workpiece W is irradiated with uniform light. Therefore, the shadow generated on the ground pattern of the workpiece W is eliminated. At this time, only an abnormality of the surface shape of the workpiece W is identified. That is, the flaw E2 on the surface of the workpiece W, the peeling E3 of the surface coat of the workpiece W, or the burr E4 is identified.

According to the appearance inspection apparatus 500 and the appearance inspection step S500, the workpiece W is lifted up to the lower end of the second B case 215 of the second lighting unit 210 in the lifting step S205. Therefore, the workpiece W can be irradiated with light at all incident angles from 0 degrees to 90 degrees.

According to the appearance inspection apparatus 500 and the appearance inspection step S500, white light is used for the first lighting 111, the second A lighting 211, and the second B lighting 214. Therefore, for example, when blue light is used, the light receiving sensitivity of the image sensor may be insufficient. However, when white light is used, there is no shortage of light receiving sensitivity.

The embodiment of the present invention has been described. The scope of the present invention is not limited to the above embodiment. Various changes can be made without departing from the spirit of the invention.

For example, the first detection unit 130 and the second detection unit 230 may be the same computer system.

For example, the first detection unit 130 may store an image of the workpiece W in a normal state in advance, and detect the foreign substance E1 by comparing the image of the workpiece W in a normal state with the image P1. The second detection unit 230 may store an image of the workpiece W in a normal state in advance, and compare the image of the workpiece W in a normal state with the image P2 to thereby detect the flaw E2 on the surface of the workpiece W, the peeling of the surface coating of the workpiece W E3, or the burr E4.

For example, the first inspection unit 100 may be provided downstream of the second inspection unit 200. The first inspection step S100 may be performed after the second inspection step S200.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. An appearance inspection apparatus for inspecting appearance of a workpiece, the apparatus comprising:
   a first lighting unit that irradiates the workpiece with light;
   a first imaging unit that images the workpiece irradiated by the first lighting unit;
   a first detection unit that detects a first defect from an image captured by the first imaging unit;
   a second lighting unit that irradiates the workpiece with light;
   a second imaging unit that images the workpiece irradiated by the second lighting unit; and
   a second detection unit that detects a second defect from an image captured by the second imaging unit,
   wherein
   the first lighting unit uses coaxial epi-illumination, and
   the second lighting unit uses coaxial epi-illumination and dome illumination.

2. The appearance inspection apparatus according to claim 1, further comprising
   a lifting unit that lifts or lowers the workpiece toward the second lighting unit,
   wherein the lifting unit is provided below the second lighting unit in a vertical direction.

3. The appearance inspection apparatus according to claim 1, wherein the first lighting unit and the second lighting unit use white light.

4. The appearance inspection apparatus according to claim 2, wherein the first lighting unit and the second lighting unit use white light.

5. An appearance inspection method for inspecting appearance of a workpiece, the method comprising:
   a first lighting step of irradiating the workpiece with light;
   a first imaging step of imaging the workpiece that is irradiated in the first lighting step;
   a first detection step of detecting a first defect from an image captured in the first imaging step;
   a second lighting step of irradiating the workpiece with light;

a second imaging step of imaging the workpiece irradiated in the second lighting step;

a second detection step of detecting a second defect from an image captured in the second imaging step, wherein in the first lighting step, coaxial epi-illumination is used, and in the second lighting step, coaxial epi-illumination and dome illumination are used.

6. The appearance inspection method according to claim 5, wherein in the second lighting step, the workpiece is lifted or lowered in a vertical direction.

7. The appearance inspection method according to claim 5, wherein in the first lighting step and the second lighting step, white light is used.

8. The appearance inspection method according to claim 6, wherein in the first lighting step and the second lighting step, white light is used.

* * * * *